United States Patent
Calman (10) Patent No.: US 8,356,302 B1
(45) Date of Patent: Jan. 15, 2013

(54) PERSISTENT DISPLAY OF TRAJECTORY OF RATE OF RESOURCE CONSUMPTION FOR USE IN MONITORING RESOURCE CONSUMPTION

(75) Inventor: Matthew A. Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1230 days.

(21) Appl. No.: 11/962,231

(22) Filed: Dec. 21, 2007

(51) Int. Cl.
*G06F 9/46* (2006.01)
*G06F 3/12* (2006.01)

(52) U.S. Cl. ........ 718/101; 718/104; 718/100; 358/1.15

(58) Field of Classification Search .................. None
See application file for complete search history.

(56) References Cited

U.S. PATENT DOCUMENTS

| | | |
|---|---|---|
| 5,694,529 A | 12/1997 | Fromherz |
| 7,561,291 B2 * | 7/2009 | Horiyama .................... 358/1.15 |
| 2003/0071726 A1 * | 4/2003 | Hopper et al. ................ 340/540 |
| 2004/0078425 A1 | 4/2004 | Sandfort et al. |
| 2005/0068571 A1 | 3/2005 | Hart et al. |
| 2005/0231759 A1 * | 10/2005 | Kamijima .................... 358/1.15 |
| 2006/0203272 A1 | 9/2006 | Manalo et al. |
| 2007/0159647 A1 | 7/2007 | Carling et al. |
| 2007/0229886 A1 | 10/2007 | Sakurai |
| 2008/0079989 A1 * | 4/2008 | Agnetta et al. ............... 358/1.15 |
| 2008/0273224 A1 * | 11/2008 | Maulsby et al. ............. 358/1.15 |

OTHER PUBLICATIONS doculynxinc.com/ retrieved on Sep. 3, 2008.
International Search Report for International Application No. PCT/US08/87587 dated Feb. 5, 2009 (2 pages).

\* cited by examiner

*Primary Examiner* — Jennifer To
*Assistant Examiner* — Bing Zhao
(74) *Attorney, Agent, or Firm* — Weiss & Arons LLP; Michael Springs (57) ABSTRACT

Systems, methods and consumer-readable media for self-monitoring of resource consumption are provided. A system according to the invention may include a computer, a resource-consuming output device—e.g., a printer—coupled to the computer, and a goal storage device that stores a pre-set resource consumption goal. The computer may be configured to receive a print command, estimate resource consumption associated with the print command, and tally a total user resource consumption amount. The total user resource consumption amount may include the estimated resource consumption for the print command. The computer may also be configured to compare the total user resource consumption amount with the pre-set goal and to display a visual indication of the comparison of the total user resource consumption with the pre-set goal.

15 Claims, 8 Drawing Sheets

PERSISTENT DISPLAY OF TRAJECTORY OF RATE OF RESOURCE CONSUMPTION FOR USE IN MONITORING RESOURCE CONSUMPTION

FIELD OF TECHNOLOGY

Aspects of the disclosure relate to resource consumption.

BACKGROUND

Many corporate and personal computer users generate hardcopy output in the course of their daily work. For both economic and environmental reasons, reducing the use of paper and other associated resources is generally considered beneficial.

Accordingly, it would be desirable to provide systems and methods to help an individual self-monitor resource consumption.

SUMMARY OF THE INVENTION

It is an object of this invention to provide systems and methods to help an individual self-monitor resource consumption.

A method according to the invention may include receiving a print command from a user's computer. The print command may preferably be for printing a document. The method may further include estimating resource consumption associated with the print command. In addition, the method may include tallying a total user resource consumption amount. The total amount may preferably include the estimated resource consumption associated with the print job. The method may compare the total user resource consumption amount with a pre-set resource consumption goal. The method may display a visual indication of the comparison of the total user resource consumption with the pre-set goal.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Systems and methods according to the invention provide a platform for an individual to set goals for resource consumption. Based on the user-set goals, systems and methods according to the invention may preferably provide direct visual and/or auditory feedback relating to the user's resource consumption (a "green meter"). This feedback may preferably be provided immediately prior to execution of user-requested print commands.

The visual feedback may be provided on the display of the user computer. In one embodiment of the invention, this feedback may be provided in a print dialogue box provided to the user. Most preferably, the visual feedback may indicate user progress to the user-set goal. In other alternative embodiments of the invention, the goals may also be administrator-set and/or system-set based on preferably pre-determined system protocols.

In one exemplary embodiment of the invention, whenever a computer user sends a document to print, whether through a network or to a directly-connected printer, preferably prior to user execution of a print command—i.e., through a user pressing a "print" button—an algorithm according to the invention tallies the number of pages, paper size, paper type, and/or type of output to be produced (color, black/white, fax/ and the like) by the print job. This tallied information may be stored. In some embodiments of the invention, these various resources may be referred to as green factors, and/or green parameters.

The user could, in certain embodiments of the invention, be provided with an estimate of consumption for the present job and a goal status preferably substantially immediately prior to printing. Upon receipt and, preferably, acknowledgment of the resource consumption estimate, the user may be queried whether he or she wishes to continue to print. This consumption data could also be reported to a central server for enterprise-wide analysis and reporting.

In one embodiment of the invention, objects or icons may be displayed on the user's computer display indicating actual consumption versus the pre-set goal. Such objects or icons may take the form of a stoplight (red/yellow/green) which indicates the proper course of action—i.e., an instruction indication. Other such objects or icons may include a meter (similar to an automobile dashboard gauge) which indicates the present rate at which resources are being consumed, a tree with varying levels of foliage which may indicate progress to goal (leafy tree indicates positive progress to goal, barren tree indicates poor performance to goal) or other creative interpretation of ecological health or goal achievement.

Certain embodiments of the invention may delineate individual resource consumption goals by job function, department, or other criteria. Roll-up reporting by organizational hierarchy could allow for reporting of whole organizations with a real-time visual indicator of progress.

A process according to the invention may involve the following operations. First, the user may initiate a print command on his computer. The user can then select the output device (color printer, black/white printer, fax, and the like). An algorithm computes the resources required for the job, including such factors as paper size, paper type, ink type, printing options, and the like. The impact of the print job on the user's consumption goal may be displayed and the user can be queried whether or not the user elects to proceed.

With respect to the step of displaying the impact of the print job on the user's computer—certain embodiments of the invention may also, or alternatively, substantially continuously display a consumption meter/icon on the user's desktop independent of the user's current involvement in a print job or other computer output activity. Accordingly, systems and methods according to the invention may include at least two possible implementations of a resource consumption meter: one implementation that displays a meter substantially constantly independent of the user's current involvement in a print job, and another implementation that typically only displays a meter at a point when a user is deciding whether to send a print job to an output device.

In one embodiment of the invention, if the user elects to proceed with the computer output, the output is sent to the printer, the document is printed, and the actual consumption data is returned to, or otherwise tallied by, the computer. Tallies of consumption data are updated and stored locally and optionally, on an enterprise storage device for further reporting. A visual gauge, or other similar object, as described above, can then be displayed to the user indicating the user's progress to the resource consumption goal. Analysis and reporting of consumption goal performance can be run ad hoc from either a local or enterprise network data storage.

In some embodiments of the invention, a supervisor (or other suitable management-oriented individual) may be provided with multiple displays on his/her computer. For example, such a user may be provided with two indicators that can be constantly viewable on the administrative user's display. A first icon may show the personal performance for the administrative user, and a second icon can show subordinate group performance. In another embodiment of similar systems and methods according to the invention, the supervisor may select to view a meter or icon associated with a particular one of his or her subordinates. In this way, the meter according to the invention provides at least three different displays that may be implemented either individually or in some preferably predetermined combination.

In order to implement methods according to the invention the following systems may be required. A personal computer, or other suitable data processing device, is needed, as well as an output device, such as a locally connected printer, a network printer, a remote fax machine, and the like. Optionally, a communication network and storage of goal and actual consumption data may be implemented locally, and optionally, network-connected storage of the same may be implemented for enterprise reporting.

Figure 1:
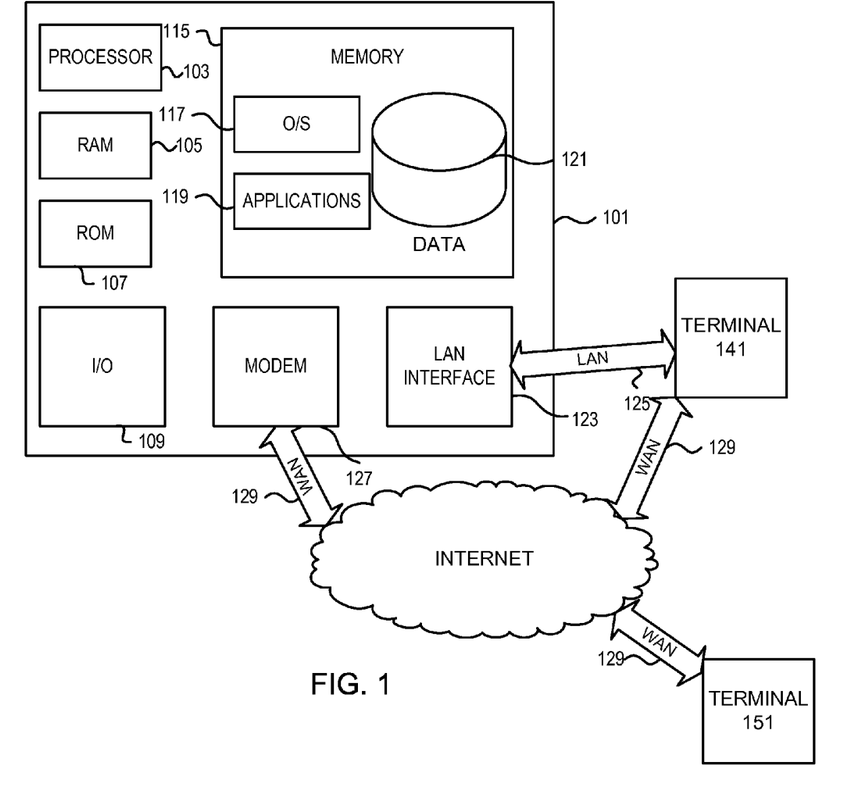
FIG. 1 illustrates a schematic diagram of a general-purpose digital computing environment in which one or more aspects of the present invention may be implemented.

FIG. 1 illustrates a block diagram of a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

I/O module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide centralized storage of account information and account holder information for the entire business, allowing interoperability between different elements of the business residing at different physical locations.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119 used by server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Figure 2:
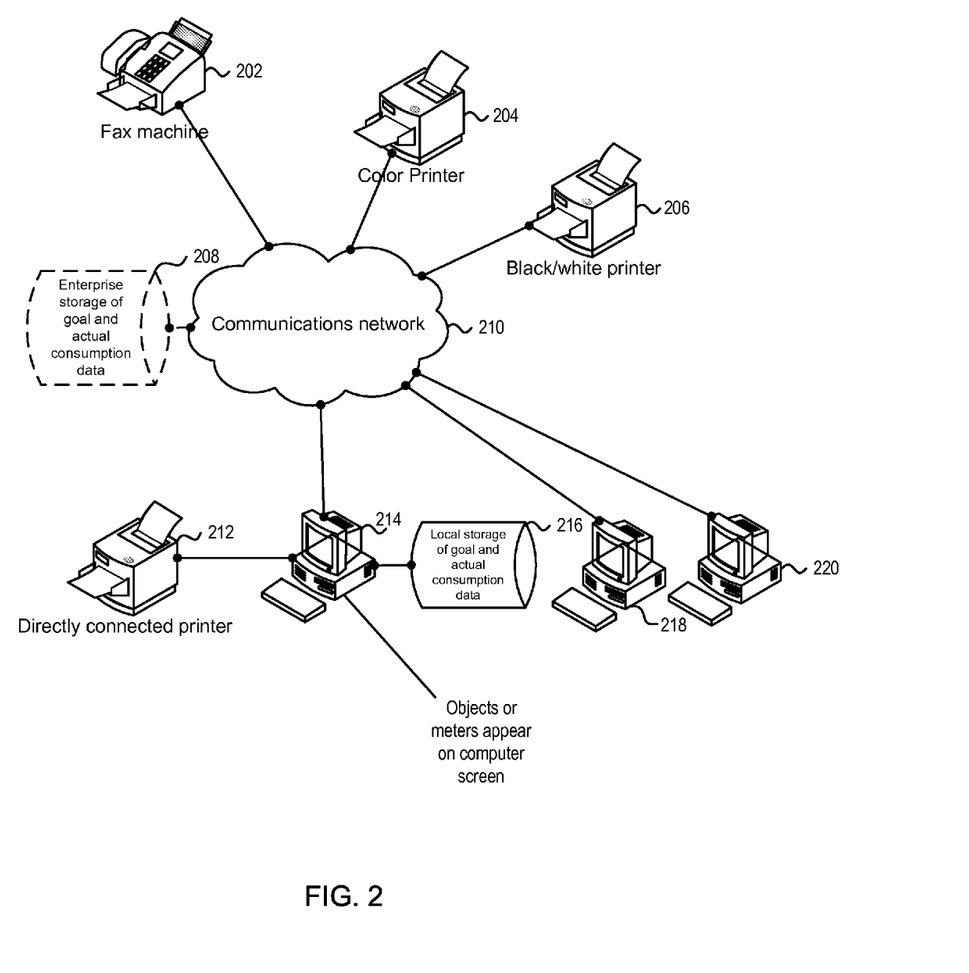
FIG. 2 shows an embodiment of a system that may be used to implement a process according to the invention.

FIG. 2 shows an embodiment of system that may be used to implement a process according to the invention. The system may preferably include a fax machine 202, a color printer 204, a black/white printer 206, an enterprise storage facility 208, a communications network 210, a computer 214, a directly connected printer 212, local storage facility 216 for the computer, and other exemplary computers 218, 220.

The system may perform a process such as that shown below in FIG. 3. It should be noted that computer 214 should preferably be adapted to display objects, meters, or any other suitable indicator to indicate the consumption status of the user. It should be noted as well that the system in FIG. 2 is merely exemplary and not all the components of the system are required to implement an embodiment of the invention.

Figure 3:
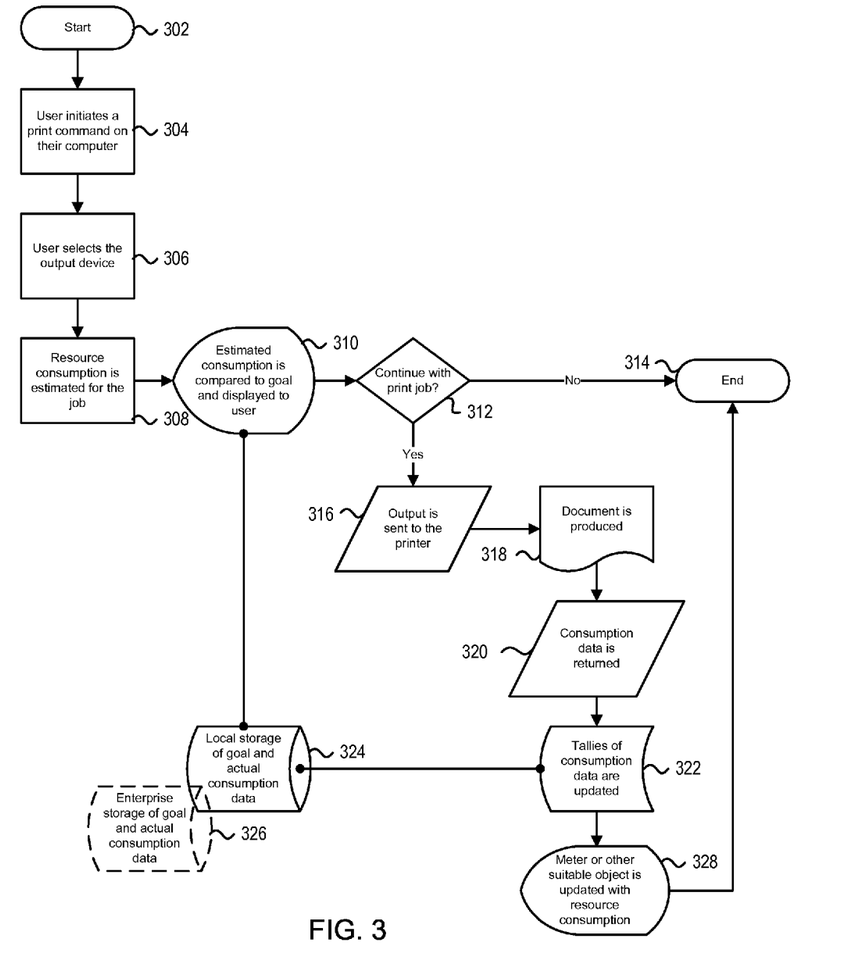
FIG. 3 shows an illustrative flow diagram of a process for implementing self-monitoring of resource consumption.

FIG. 3 shows an illustrative flow diagram of a process for implementing self-monitoring of resource consumption. Step 302 begins the process flow for self monitoring resource consumption.

The process starts at step 302. It should be noted that at step 302, a user's current "performance to goal" for resource consumption could be visible as a desktop "icon" or meter independent of any particular print job. Based on observation of that icon, a user may elect not to print and consume further resources.

A print request process may initiate in Step 304, when the user selects a print command on the user's computer. Preferably, the system is implemented in an environment wherein a specific user is capable of logging in to the workplace network environment on any networked computer, but is accountable for all output he/she initiates.

In step 306, the user selects the output device. In step 308, the resource consumption is estimated for the job. The estimated consumption can then be used to be compared to the goal and be displayed to the user, as shown in step 310. The step of comparing the estimated consumption to the goal may include a number of different embodiments of the invention.

An embodiment of this comparison may include adding the present information to a table that projects a blended consumption rate for a predetermined amount time against a pre-set goal for the predetermined amount of time. An alternative embodiment of this comparison may analyze the print "job" on an individual basis—i.e., does this job pass a resource consumption threshold for the user over a distinct time interval? Other alternatives types of goal comparisons are within the scope of this patent application.

After estimated consumption is determined and a comparison of the estimated consumption to a goal is displayed to a user, the user may be queried whether he or she wishes to continue with the job, as shown in step 312. In certain embodiments of the invention, the user may only be queried when a predetermined threshold of resource consumption is surpassed. Such threshold may be characterized in terms of the goal comparison or in terms of the objective amount of resources consumed irrespective of a comparison to a pre-set goal.

If the user elects to terminate the job, then the process ends at step 314. If the user elects to continue with the job, then the job is sent to the output device—e.g., printer—as shown at step 316. Thereafter, the document is produced, as shown at step 318.

Following the printing of the document, the consumption data is returned, as shown at step 320, and tallies of consumption data are updated. These tallies may be updated in local storage, as shown in step 324. Local storage may also include storage of actual consumption data. The tallies may also be updated in enterprise storage, which may also store goal data and actual consumption data, as shown in step 326.

Step 328 shows that a meter or other suitable object may updated, preferably on the display of the user computer, to indicate the current status of resource consumption.

Following display of updated information, the process may loop back to end at step 314.

Figure 4:
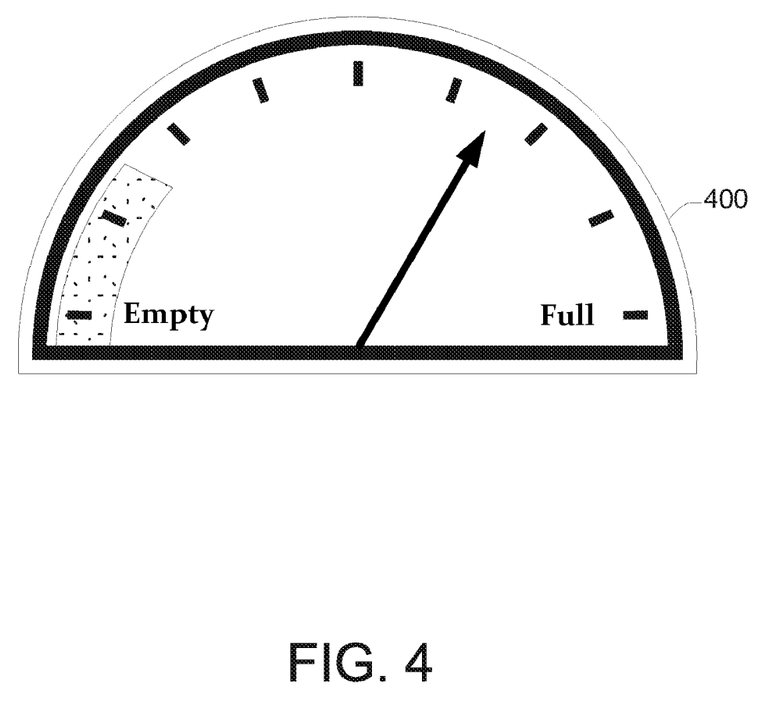
FIG. 4 shows a first visual indicator of resource consumption.

FIG. 4 shows a first visual indicator of resource consumption. The gauge 400 may indicate the status of the remaining resources that the user may consume prior to surpassing a preferably pre-set goal. The remaining resources may be shown in terms of gasoline left in the tank before the tank runs to empty.

Figure 5:
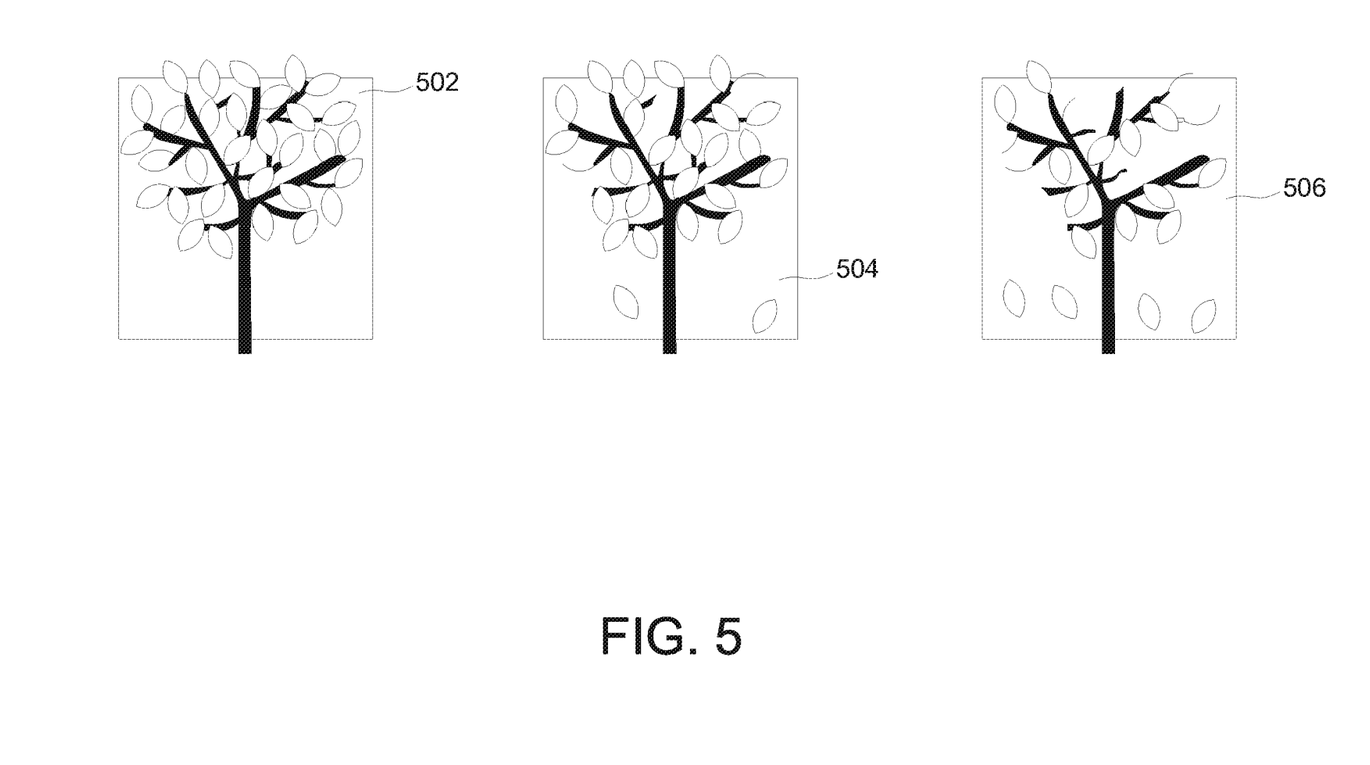
FIG. 5 shows a second visual indicator of resource consumption.

FIG. 5 shows a second visual indicator of resource consumption. Tree 502 may indicate a first state of resource consumption—i.e., at the beginning of a consumption period, prior to the use of resources. In this embodiment, but the goal may be indicated by total number of leaves on the tree.

Tree 504 may indicate a second state of resource consumption. In tree 504, some of the leaves have fallen off the tree to indicate that some of the resources have been consumed.

Tree 506 preferably shows a more advance state of resource consumption. It should be noted that a user may not be restricted to any particular visual indication of resource consumption. Rather, a user may be presented with a selectable menu of resource consumption indicators wherein the user can choose a particular indicator that best fits his consumption and/or his individual tastes. Alternatively, a user may be provided with a toolkit to create the user's own customized visual indicator. This may heighten the experience associated with the self-monitoring of resource consumption and increase adherence to a self-monitoring program.

Figure 6:
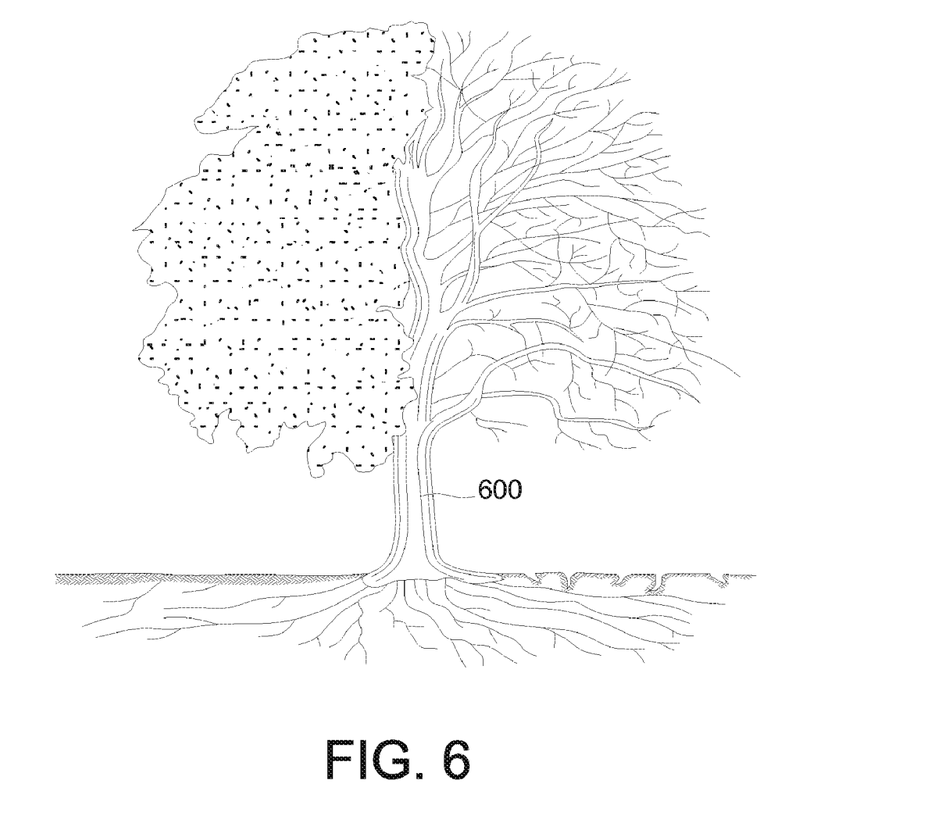
FIG. 6 shows a third visual indicator of resource consumption.

FIG. 6 shows yet another visual indicator of resource consumption. Tree 600 preferably is stripped of its leaves as the user consumes resources. Tree 600 may be more effective than other visual indicators because it provides a message associated with the destruction of resources in general that result from the individual over-consumption of resources. Alternatively, pictures of the Earth or a forest could be used as indicators, according to the preferences of the user or corporate entity deploying the invention.

Figure 7:
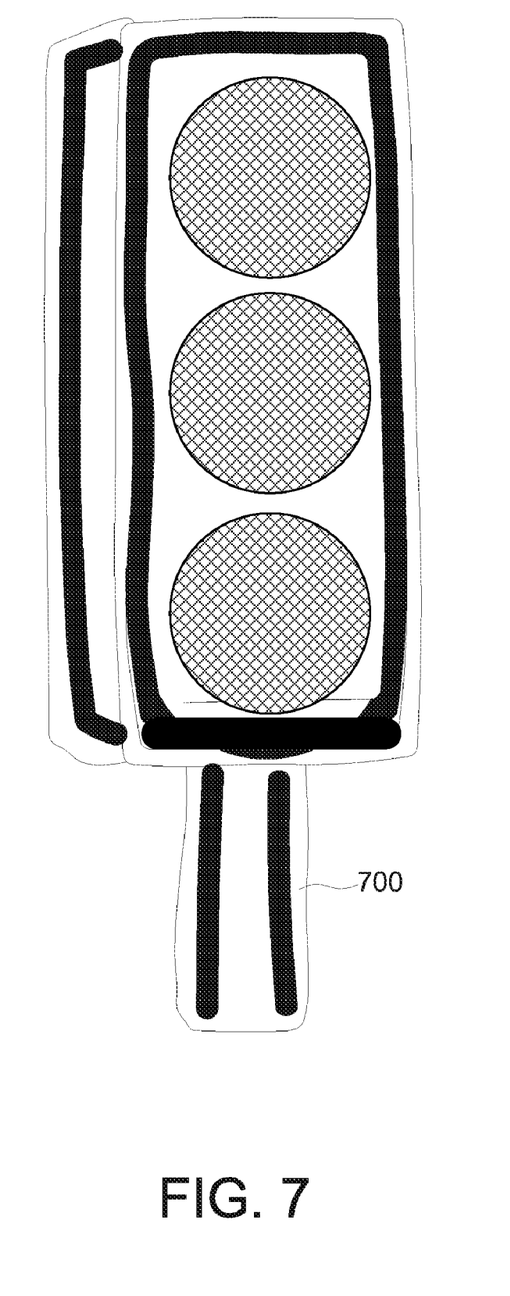
FIG. 7 shows a third visual indicator of resource consumption.

FIG. 7 shows a fourth visual indicator of resource consumption. Stoplight 700 may preferably provide a user with an indication of the rate at which he is presently consuming resources. For example, a green light may indicate that the user is presently proceeding at an acceptable rate and he may continue to consume resources in the manner that he is consuming them. A yellow light may indicate that the user should proceed with caution in his resource consumption, as his present path may not get him to his intended goal. A red light may indicate that the user must stop his present course of action and proceed along a new path of resource consumption in order to achieve his consumption goals.

Figure 8:
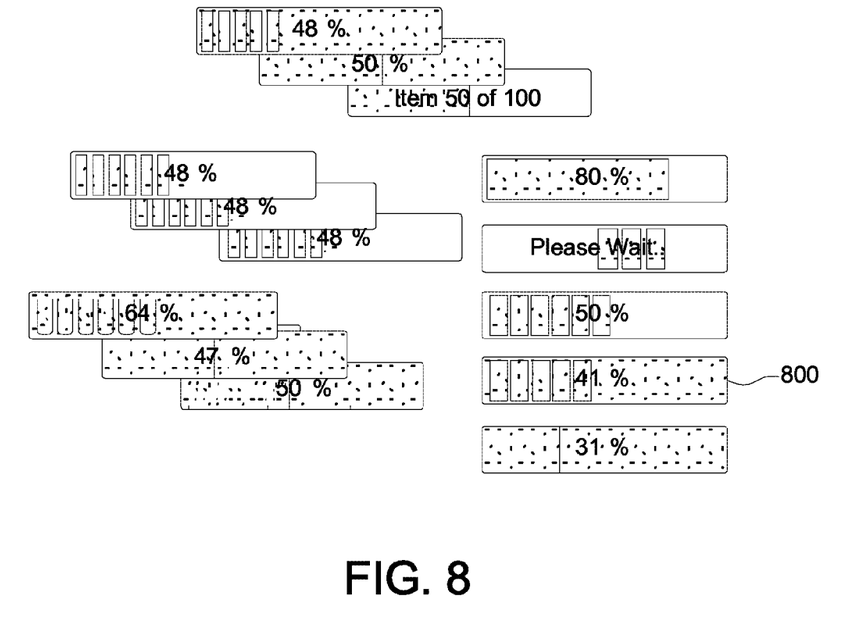
FIG. 8 shows a fourth visual indicator of resource consumption.

FIG. 8 shows a plurality of gauges 800 that may be provided to a user to choose an acceptable indication of resource consumption. One or a plurality of the gauges may be selected by a user to help the user self-monitor his resource consumption.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for helping individuals monitor resource consumption according to the invention have been provided. Persons skilled in the art will appreciate that the present invention can be practiced by other than the described embodiments, which are presented for purposes of illustration rather than of limitation, and the present invention is limited only by the claims which follow.

What is claimed is:

1. A method comprising:
    storing, at a computer:
        a total actual tangible resource consumption amount associated with a plurality of executed print commands executed since a predetermined point in time; and
        a pre-set resource consumption goal, said goal which is definable at the computer, said goal that is defined for the amount of time since the predetermined point in time, wherein the tangible resources comprise at least one of a number of pages, paper size, paper type, ink, power and/or heat;
    comparing, at the computer, the total actual tangible resource consumption amount with the pre-set resource consumption goal, to determine a trajectory of a rate at which tangible resources are being consumed relative to the pre-set resource consumption goal;
    maintaining a persistent display, at the computer, the display comprising a first pictorial indication of the trajectory;
    transmitting a print command from a user of the computer, the print command to print a document;
    estimating, at the computer, a projected tangible resource consumption amount associated with the print command;
    determining, at the computer, using the projected tangible resource consumption amount, a projected update to the trajectory;
    displaying, at the computer, a second pictorial indication of the trajectory based on the projected update to the trajectory;
    following the displaying of the second pictorial indication, querying, at the computer, whether the user elects to proceed with the print command;
    subsequent to the user electing to proceed with the print command, tallying, at the computer, an actual tangible resource consumption amount associated with the print command, in order to update the stored total actual tangible resource consumption amount;
    determining, at the computer, an actual update to the trajectory based on an updated total actual tangible resource consumption amount; and
    updating, at the computer, the first pictorial indication based on the actual update to the trajectory.

2. The method of claim 1 wherein the pre-set resource consumption goal is user-definable.

3. The method of claim 1 wherein the pre-set resource consumption goal is system-set.

4. The method of claim 1 further comprising, following the display of the second pictorial indication, querying whether the user elects to proceed with the print command, said querying comprising displaying a query in a print command dialogue box on the computer transmitting the print command.

5. The method of claim 1 further comprising displaying, at the computer, a visual indicator that illustrates remaining tangible resources in a selected printer following the execution of the print command.

6. The method of claim 1 further comprising displaying, at the computer, a visual indicator that illustrates remaining tangible resources based on the stored total actual tangible resource consumption amount and the pre-set resource consumption goal.

7. One or more non-transitory computer-readable media storing computer-executable instructions which, when executed by a processor on a computer system, perform a method for implementing a system for self-monitoring of resource consumption, the method comprising:
    storing, at a computer:
        a total actual tangible resource consumption amount associated with a plurality of executed print commands executed since a predetermined point in time; and
        a pre-set resource consumption goal, said goal which is definable at the computer, said goal that is defined for the amount of time since the predetermined point in time, wherein the tangible resources comprise at least one of a number of pages, paper size, paper type, ink, power and/or heat;
    comparing, at the computer, the total actual tangible resource consumption amount with the pre-set resource consumption goal, to determine a trajectory of a rate at which tangible resources are being consumed relative to the pre-set resource consumption goal;
    maintaining a persistent display, at the computer, the display comprising a first pictorial indication of the trajectory;
    transmitting a print command from a user of the computer, the print command to print a document;
    estimating, at the computer, a projected tangible resource consumption amount associated with the print command;
    determining, at the computer, using the projected tangible resource consumption amount, a projected update to the trajectory;
    displaying, at the computer, a second pictorial indication of the trajectory based on the projected update to the trajectory;
    following the displaying of the second pictorial indication, querying, at the computer, whether the user elects to proceed with the print command;
    subsequent to the user electing to proceed with the print command, tallying, at the computer, an actual tangible resource consumption amount associated with the print command, in order to update the stored total actual tangible resource consumption amount;

determining, at the computer, an actual update to the trajectory based on an updated total actual tangible resource consumption amount; and updating, at the computer, the first pictorial indication based on the actual update to the trajectory.

8. The method of claim 7 wherein the pre-set resource consumption goal is user-definable.

9. The method of claim 7 wherein the pre-set resource consumption goal is system-set.

10. The method of claim 7 further comprising implementing the query in a print command dialogue box.

11. The method of claim 7 further comprising displaying a visual indicator that illustrates remaining tangible resources attributed to the user prior to the user surpassing the pre-set goal.

12. A system comprising:
a computer;
an output device coupled to the computer; and
a goal storage device, that stores a pre-set tangible resource consumption goal, the computer configured to:
store:
a total actual tangible resource consumption amount associated with a plurality of executed print commands executed since a predetermined point in time; and
a pre-set resource consumption goal, said goal which is definable at the computer, said goal that is defined for the amount of time since the predetermined point in time, wherein the tangible resources comprise at least one of a number of pages, paper size, paper type, ink, power and/or heat;
compare the total actual tangible resource consumption amount with the pre-set resource consumption goal, to determine a trajectory of a rate at which tangible resources are being consumed relative to the pre-set resource consumption goal;
maintain a persistent display, the display comprising a first pictorial indication of the trajectory;
transmit a print command from a user of the computer, the print command to print a document;
estimate a projected tangible resource consumption amount associated with the print command;
determine, using the projected tangible resource consumption amount, a projected update to the trajectory;
display a second pictorial indication of the trajectory based on the projected update to the trajectory;
following the display of the second pictorial indication, query whether the user elects to proceed with the print command;
subsequent to the user electing to proceed with the print command, tally an actual tangible resource consumption amount associated with the print command, in order to update the stored total actual tangible resource consumption amount;
determine an actual update to the trajectory based on an updated total actual tangible resource consumption amount; and
update the first pictorial indication based on the actual update to the trajectory.

13. The system of claim 12 wherein the computer comprises the goal storage device.

14. The system of claim 12 further comprising a communications network that couples the computer, the output device and the goal storage device.

15. The system of claim 12 further comprising a communications network that couples the computer and the output device, and wherein the computer comprises the goal storage device.

* * * * *